US012682675B2

(12) United States Patent
Wang et al.

(10) Patent No.: US 12,682,675 B2
(45) Date of Patent: Jul. 14, 2026

(54) EXTENSIBLE ARCHITECTURE WITH MULTIMODAL FEATURE FUSION FOR DOCUMENT CLASSIFICATION

(71) Applicant: PayPal, Inc., San Jose, CA (US)

(72) Inventors: Yuan Wang, Nanjing (CN); Ao Li, Shanghai (CN); Yan Shen, Singapore (SG); Raghotham Sripadraj, Bengaluru (IN); Zhibai Wang, Shanghai (CN); Ruobai Wang, Shanghai (CN); Jingwen Xu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 258 days.

(21) Appl. No.: 18/527,904

(22) Filed: Dec. 4, 2023

(65) Prior Publication Data

US 2025/0131760 A1      Apr. 24, 2025

(30) Foreign Application Priority Data

Oct. 18, 2023      (IN) .............................. 202341071181

(51) Int. Cl.
*G06V 30/413* (2022.01)
*G06N 3/0455* (2023.01)
(Continued)

(52) U.S. Cl.
CPC ......... *G06V 30/413* (2022.01); *G06N 3/0455* (2023.01); *G06N 3/084* (2013.01);
(Continued)

(58) Field of Classification Search
CPC ............. G06V 30/413; G06V 30/1918; G06V 30/418; G06V 30/416; G06V 30/19093; G06V 30/414; G06N 3/0455; G06N 3/084
See application file for complete search history.

(56) References Cited

U.S. PATENT DOCUMENTS

2006/0080316 A1* 4/2006 Gilmore .............. G06F 21/6218
707/999.009
2018/0285176 A1* 10/2018 Mozhaev .............. G06F 16/951
(Continued)

OTHER PUBLICATIONS

Hong et al., "Bros: A Pre-trained Language Model Focusing on Text and Layout for Better Key Information Extraction from Documents," Apr. 5, 2022 [online], [retrieved on Nov. 29, 2023]. Retrieved from the Internet <https://arxiv.org/abs/2108.04539>.
(Continued)

*Primary Examiner* — Syed Haider
(74) *Attorney, Agent, or Firm* — Haynes and Boone, LLP

(57) ABSTRACT

Methods and systems are presented for classifying a digital image of a document using a machine learning model framework. The machine learning model framework is configured to provide a classification output based on a fusion of features corresponding to different modalities and extracted from the digital image. The machine learning model framework includes multiple encoders. Each encoder is configured to encode features corresponding to a distinct modality into a respective embedding. Different embeddings generated by the multiple encoders are fused together using one or more fusion techniques. The fused embedding is provided to a machine learning model for classifying the document.

20 Claims, 7 Drawing Sheets

(51) Int. Cl.

| | |
|---|---|
| *G06N 3/084* | (2023.01) |
| *G06V 30/19* | (2022.01) |
| *G06V 30/416* | (2022.01) |
| *G06V 30/418* | (2022.01) |
| *G06V 30/414* | (2022.01) |

(52) U.S. Cl.
CPC .... *G06V 30/19093* (2022.01); *G06V 30/1918* (2022.01); *G06V 30/416* (2022.01); *G06V 30/418* (2022.01); *G06V 30/414* (2022.01)

(56) References Cited

U.S. PATENT DOCUMENTS

| | | | | |
|---|---|---|---|---|
| 2021/0303939 A1* | 9/2021 | Hu | ........................ | G06F 18/256 |
| 2023/0245485 A1* | 8/2023 | Rimchala | ............... | G06V 10/82 |
| | | | | 382/176 |
| 2024/0037326 A1* | 2/2024 | Vargas | ................ | G06F 16/3347 |
| 2024/0420296 A1* | 12/2024 | Zhang | .................. | G06V 10/764 |
| 2025/0252252 A1* | 8/2025 | Shetty | .................. | G06K 7/1417 |

OTHER PUBLICATIONS

Kim et al., "OCR-free Document Understanding Transformer," Oct. 6, 2022 [online], [retrieved on Nov. 29, 2023]. Retrieved from the Internet <https://arxiv.org/abs/2111.15664>.

Wang et al., "ITA: Image-Text Alignments for Multi-Modal Named Entity Recognition," Dec. 13, 2021 [online], [retrieved on Nov. 29, 2023]. Retrieved from the Internet <https://arxiv.org/abs/2112.06482>.

Hadsell et al., "Dimensionality Reduction by Learning an Invariant Mapping," 2006 [online], [retrieved on Nov. 29, 2023]. Retrieved from <http://www.cs.toronto.edu/~hinton/csc2535/readings/hadsell-chopra-lecun-06-1.pdf>.

Hoffer et al., "Deep Metric Learning Using Triplet Network," ICLR, 2015 [online], [retrieved on Nov. 29, 2023]. Retrieved from the Internet <https://arxiv.org/abs/1412.6622>.

Chen et al., "A Simple Framework for Contrastive Learning of Visual Representations," Jul. 1, 2020, [online], [retrieved on Nov. 29, 2023]. Retrieved from the Internet <https://arxiv.org/abs/2002.05709>.

Jayaswal, "Text Vectorization: Term Frequency—Inverse Document Frequency (TFIDF)," Towards Data Science, Oct. 4, 2020, [online], [retrieved on Nov. 29, 2023]. Retrieved from the Internet <https://towardsdatascience.com/text-vectorization-term-frequency-inverse-document-frequency-tfidf-5a3f9604da6d>.

Mikolov et al., "Efficient Estimation of Word Representations in Vector Space," Sep. 7, 2013, [online], [retrieved on Nov. 29, 2023]. Retrieved from the Internet <https://arxiv.org/abs/1301.3781>.

Joulin et al., "Bag of Tricks for Efficient Text Classification," Aug. 9, 2016, [online], [retrieved on Nov. 29, 2023]. Retrieved from the Internet <https://arxiv.org/abs/1607.01759>.

Vaswani et al., "Attention Is All You Need," 31st Conference on Neural Information Processing Systems (NIPS 2017), Long Beach, CA, USA, 2017, [online], [retrieved on Nov. 29, 2023]. Retrieved from the Internet <https://arxiv.org/abs/1706.03762>.

Devlin et al., "BERT: Pre-training of Deep Bidirectional Transformers for Language Understanding," Oct. 11, 2018, [online], [retrieved on Nov. 29, 2023]. Retrieved from the Internet <https://arxiv.org/abs/1810.04805>.

Reimers et al., "Sentence-BERT: Sentence Embeddings using Siamese BERT-Networks," Aug. 27, 2019, [online], [retrieved on Nov. 29, 2023]. Retrieved from the Internet <https://arxiv.org/abs/1908.10084>.

Huang et al., "LayoutLMv3: Pre-training for Document AI with Unified Text and Image Masking," Jul. 19, 2022, [online], [retrieved on Nov. 29, 2023]. Retrieved from the Internet <https://arxiv.org/abs/2204.08387>.

* cited by examiner

400

EXTENSIBLE ARCHITECTURE WITH MULTIMODAL FEATURE FUSION FOR DOCUMENT CLASSIFICATION

BACKGROUND

The present specification generally relates to machine learning models, and more specifically, to providing a machine learning model framework for processing digital images of physical documents according to various embodiments of the disclosure.

RELATED ART

Online service providers often strive to offer users a convenient way to conduct electronic transactions. For example, an online service provider may provide an online portal accessible by an electronic device (e.g., a mobile device, a computer, etc.), through which a user may conduct an electronic transaction with the online service provider and/or another entity. The user may provide the necessary information to the online portal in order to complete the electronic transaction. In some instances, the user may be required to submit one or more documents (e.g., a proof of identity document such as a passport, a driver's license, etc., a proof of shipment document such as a shipping invoice, a shipment receipt, etc., a proof of income document such as a bank statement, a payment stub, etc., legal documents, or other types of documents) to facilitate the processing of the transaction. Due to the nature of some of these documents which may be available only in a physical format, the user may be required to capture a digital image of the document, and submit the digital image of the document to the online portal for processing the transaction.

Unlike other types of digital information that can be easily processed and analyzed, extracting and analyzing information from an image of a physical document can be a complex process. To further exacerbate the problem, the user may have submitted a wrong type of document, a duplicate document, and/or a tampered document. The online service provider may not be able to discover the problems with the image of the document unless the image has been adequately processed (a substantial amount of computer resources may have been wasted by then). In such instances, the online service provider may not be able to extract any information from the image, or extract information that is incorrect or irrelevant to the processing of the transaction. Processing the transaction with incorrect and/or irrelevant information extracted from the image would not contribute to an advancement to the processing of the transaction. In a worse case, it would lead to an incorrect risk classification of the transaction, which would result in data and/or monetary loss to the service provider and/or its users. As such, there is a need for improved techniques that can quickly and accurately verify or classify a digital image of a document such that any problems with the document (e.g., a wrong type, a duplicate document, tampered document, etc.) can be identified and resolved before the document is fully processed.

Figure 1:
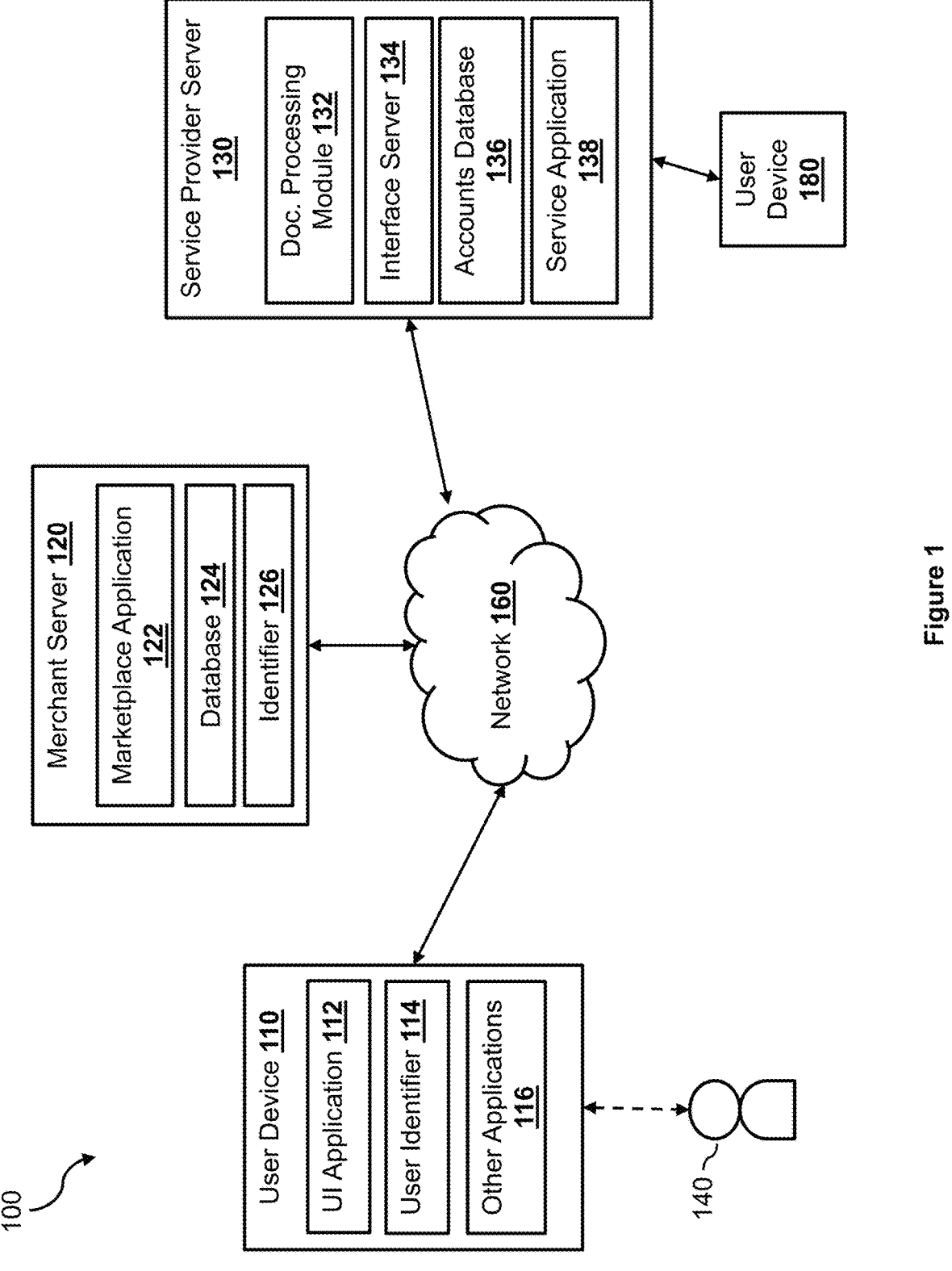
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for classifying a digital image of a document using a machine learning model framework. In some embodiments, the machine learning model framework is configured to provide a classification output based on a fusion of features corresponding to different modalities extracted from the image of the document. As discussed herein, online service providers often process images of documents as part of the processing of electronic transactions. For example, an online service provider may request a user to submit a proof of identification document (e.g., a passport, a driver's license, etc.) when processing certain transactions for the user that require verification of the user's identity (e.g., onboarding the user to the service provider, accessing certain data or account information, unlocking an account that has been locked or suspended, approving a transaction, etc.). In another example, the online service provider may request a user to submit a proof of shipment document (e.g., a shipment invoice, a shipment receipt, a shipping label, etc.) when processing certain transactions for the user that require a proof that an item has been shipped (e.g., a release of funds to the merchant in a purchase transaction, etc.).

In these scenarios, the user may capture (or otherwise generate) an image of the document (e.g., a jpg format, a pdf format, etc.), and submit the image to the online service provider, for example, via an online portal of the online service provider. A document processing system associated with the online service provider may process the image of the document. For example, the document processing system may extract different types of data, such as text data (e.g., a name, a shipping courier name, a birthdate, an identification number, etc.), image data (e.g., a photo of the user, a logo, etc.), and/or other types of data from the image, and may use the extracted data to process the transaction (e.g., to verify an identity of the user, to verify a shipment of an item, etc.).

However, processing the image of the document can be a complex process and incurs a substantial amount of computational cost (e.g., computer processing power, memory usage, etc.). When an incorrect document is submitted (e.g., a wrong type of document, a duplicate document that has been submitted for another transaction or user account, a document that has been tampered with, etc.), the computer resources used for processing the image may be wasted. In a worst case, incorrect information may be extracted from the image. Using the incorrect information to process the transaction may lead to an inaccurate risk classification of the transaction, which can result in a breach of data security for the online service provider and/or monetary loss to the online service provider and/or its users.

As such, it is beneficial for the document processing system of the online service provider to verify and/or classify an image of a document before fully processing the image of the document, such that images of documents that do not produce useful information for the transaction would be ignored and/or flagged, and only images of documents that can produce useful information for the transaction would be processed by the document processing system. In some embodiments, the document processing system may use the machine learning model framework to classify the image of the document, such as to determine whether the document corresponds to the type of document being requested (e.g., whether the document in the image is a passport, a shipment invoice, etc.), whether the document is a duplicate document that has been previously submitted for another transaction and/or for another user account, whether the image of the document has been tampered with, etc.

Classifying documents based on digital images has its unique set of challenges. Unlike classifying images of different objects (e.g., a car, a balloon, a STOP sign, etc.), where the objects have distinctive features (e.g., different colors, different shapes, different unique characteristics, etc.), documents of various types typically share many common features. For example, most documents include a combination of text and images in a particular layout, and in some cases, different types of documents may share similar content. Consider a passport card and a driver's license, where both types of documents include a photo of a person, a name, several dates (e.g., a date of birth, an issuance date, an expiration date, etc.), a gender, an identification number, etc. The layout of the passport card and various driver's licenses from different states may be similar as well. As such, it would be difficult for a system to determine if a document corresponds to a passport card or a driver's license based solely on features of a single modality (e.g., a text modality, a layout modality, an image modality, etc.).

As such, according to various embodiments of the disclosure, the system associated with the online service provider may use a machine learning model framework that is configured to classify an image of a document based on a fusion of features corresponding to different modalities extracted from the image. In some embodiments, the machine learning model framework may be configured to extract features of the different modalities from the image. As such, the machine learning model framework may include multiple encoders (e.g., computer models) configured to extract features of different modalities from an image. The encoders may include one or more dedicated encoders, where each dedicated encoder is configured to extract features corresponding to a single modality. The encoders may also include one or more multimodal encoders, where each multimodal encoder is configured to extract features corresponding to multiple modalities.

In some embodiments, the extracted features may include visual features representing imagery characteristics of the document, such as an overall look and feel, a texture, a shape of the document, etc. In some embodiments, the visual features can be extracted using a dedicated computer vision (CV) model or using a multimodal model as a subset of its extracted features.

Unlike images of other objects such as nature scenery, street signs, etc., images of business documents often include a large amount of text. The semantic meaning of the text can play a crucial role in determining the type of document within which the text appears. As such, the document processing system may also extract semantic features from the image. For example, the document processing system may first extract text from the image by parsing the text (if the image includes text data) or by performing an optical character recognition (OCR) algorithm on the image. The document processing system may then provide the text to a text embedding model to extract semantic embeddings based on the text.

The extracted features may also include layout features that represent a structure of various data (e.g., various text data, image data, etc.) that appears in a document. For example, a bank statement may have a structure that includes a transaction table within the document. In another example, a U.S. passport card may have a structure that includes a large image of a person on the left, a small image of the same person on the right, a vertically aligned code next to the large image, and text between the large image and the small image. As such, the structure of each type of documents bears information that is relevant in classifying a document in an image. The document processing system may also use either a dedicated encoder or a multimodal encoder to extract the layout features from the image.

The extracted features may also include lexical features that represent statistical information regarding the text (e.g., words, letters, numerals, etc.) and other elements, and the locations of different types of text within the document. For example, a bank statement may include a transaction table comprising one or more transaction records. Each row in the transaction table may include a date (comprising numerals in between two "/"'s or letters representing a month near two sets of numerals, etc.), a transaction number (which likely includes all numerals), an amount (which includes mostly numerals), and a transaction description (which includes mostly words). In another example, a shipping label may include a combination of letters and numerals that represent a tracking number at a particular location of the document (depending on the shipping courier).

Depending on the type of document to be classified, features of additional modalities may also be extracted from the image. For example, if the type of document to be classified is a proof of identity document, which likely includes a photo of a person, the system may also extract facial features from the image, by using a facial feature embedding model. In some embodiments, the machine learning model framework as described herein is flexible and extensible such that additional components (e.g., additional encoders for generating additional types of features, etc.) can be integrated within the machine learning model framework without requiring a re-building and/or re-training of the machine learning model framework, as will be described in more details below.

As such, the machine learning model framework may include one or more encoders configured to extract features of various modalities from an image and encode the features into embeddings (e.g., vectors) as discussed herein. The features (which can be encoded as embeddings) may be used by a classifier (e.g., a machine learning model) for classifying the document within the image. Using features corresponding to multiple modalities to analyze the image of a document would improve the accuracy performance of the classifier over using only features corresponding to a single modality. A simple approach for using features from multiple modalities for classifying documents within images may include analyzing the features from each modality separately, and then combining results of the analyses to form the final output (e.g., a classification score). For example, different models (e.g., machine learning models) may be used to analyze features of different modalities, and would produce respective scores. A final score may be generated by combining the respective scores (optionally applying weights to different respective scores).

However, certain characteristics of the document may be lost when analyzing the features of different modalities separately, which would lead to inaccurate classification results. For example, the semantic features, the lexical features, and the layout features can be related to each other in a document (e.g., text that represents a birthdate of a person should appear in the middle of a driver's license, a date is to the left of a transaction identifier that appears in each row of a table structure of a bank statement, etc.). It would be beneficial to analyze the features of the modalities as a whole when classifying the documents within the images. As such, in some embodiments, the machine learning model framework may provide one or more components for fusing the features corresponding to different modalities before the fused features are analyzed collectively by the classifier to produce a classification output.

In some embodiments, when an encoder produces multiple sets of features (e.g., multiple embeddings, etc.) based on the image (e.g., a semantic encoder may encode each word/group of letters extracted from the image into a distinct embedding, etc.), the machine learning model framework may provide an aggregation layer that is configured to aggregate the multiple embeddings into a single embedding. For example, a semantic encoder may encode features associated with each word in the document into a distinct embedding. Each embedding may represent a meaning of the corresponding word using a series of values corresponding to different dimensions within a latent space. The aggregation layer may combine the values of the embeddings into a single embedding (e.g., the single embedding representing a sum, an average, etc., of the values from the different embeddings).

The machine learning model framework may also provide a projection layer that fuses the embeddings generated by different encoders. Features of different modalities (e.g., vectors, embeddings, etc.) may correspond to different latent spaces. For example, features of a first modality may include embeddings within a first latent space (e.g., having a first number of dimensions) while features of a second modality may include embeddings within a second latent space (e.g., having a second number of dimensions different from the first number of dimensions). As such, different techniques may be used to fuse the embeddings of different modalities together. In some embodiments, the projection layer may normalize the latent space corresponding to the different encoders into a single latent space (e.g., having a fixed number of dimensions). For example, the projection layer may determine a latent space with a fixed number of dimensions. The fixed number of dimensions may be equal to or larger than the largest number of dimensions among all of the different modalities. The projection layer may normalize each embedding by padding (e.g., adding values such as 0s or an average value, etc.) to the embeddings such that each modified embedding would correspond to the fixed number of dimensions. After converting all of the embeddings into the same latent space, the projection layer may generate a fused embedding by combining the embeddings (such as, by adding the values of the embeddings, by taking an average of the values of the embeddings, etc.).

In some embodiments, instead of normalizing the latent spaces, the projection layer may determine a latent space by combining all of the latent spaces, such that the latent space may have a number of dimensions that equals to the sum of the dimensions of the latent spaces corresponding to the different encoders. The projection layer may then concatenate the embeddings to form a fused embedding that corresponds to the newly generated latent space.

In some embodiments, in order to classify the document in the image, the machine learning model framework may configure the classifier to compare the document in the image against a baseline document. The baseline document may correspond to a type of document that is expected to be associated with the document in the image. By comparing the document in the image against the baseline document, the classifier may determine whether the document in the image is the same as the baseline document (e.g., a duplicate document) or of the same type as the baseline document based on similarities or differences between the two documents.

As such, in some embodiments, the machine learning model framework may use similar techniques as described herein to generate a fused embedding based on the baseline document. For example, the document processing system may obtain an image of the baseline document. The machine learning model framework may use the one or more encoders to extract features of different modalities associated with the baseline document from the image. The machine learning model framework may use the aggregation layer to aggregate different embeddings generated by a single encoder. The projection layer of the machine learning model framework may then fuse the embeddings generated by the different encoders into a single fused embedding.

In some embodiments, after obtaining the fused embeddings corresponding to the document and the baseline documents, the machine learning model framework may provide an alignment layer configured to perform additional processing to the fused embeddings before providing the fused embeddings to the classifier. The processing performed on the fused embeddings may amplify similarities between the two fused embeddings and/or amplify differences between the two fused embeddings. Example processing operations may include performing a subtraction operation on the two fused embeddings to generate a first comparison embedding. The alignment layer may also perform a dot product operation on the two fused embeddings to generate a second comparison embedding. In some embodiments, the two fused embeddings, and the comparison embeddings may be combined (e.g., concatenated) before providing the combined embedding as input values to the classifier. The classifier may generate a classification output based on the input values, which may indicate a classification of the document in the image, such as a likelihood that the document is identical to the baseline document, is of the same type as the baseline document, the document and/or the image has been tampered with, etc.

As discussed above, the machine learning model framework is flexible and extensible such that additional features of other modalities can be incorporated into the classification process without rebuilding and/or re-training the machine learning model (e.g., the classifier). For example, when determining whether two proof of identity documents are identical (e.g., whether the driver's license submitted by user 'A' is the same driver's license submitted by user 'B'), it may be beneficial for the machine learning model framework to include facial features as one of the modalities in the classification process. If an encoder can efficiently analyze facial features and determining face similarity between two faces (e.g., the system may leverage existing encoders since facial recognition technology is an established field), the machine learning model framework may incorporate the face encoder by providing the image of the document and the image of the baseline document to the face encoder, and incorporate the output from the face encoder into the final classification score. For example, the photo of the person that appears in the image of the document and the photo of the person that appears in the image of the baseline document may be provided to the face encoder. The face encoder may analyze the two faces appearing in the images, and produce a similarity score that indicates a similarity of the two faces. The score may then be combined with the output of the classifier to generate the final score. For example, the output from the face encoder and the output of the classifier may be weighted accordingly to optimize the classification result.

In some embodiments, when the additional modality (e.g., tampering features that indicate whether the document or the image of the document has been tampered with, etc.) is tied with other existing features used by the machine learning model framework (e.g., tampering features may be associated with the layout of the document, the text content of the document and so forth), the machine learning model framework may integrate the new features as additional input values for the classifier. For example, the new encoder may be configured to generate an additional embedding of the new modality based on the images of the two documents. The additional embedding may be fused with the embeddings generated by the other encoders, for example, by the projection layer, such that the additional embedding is also provided to the classifier as additional inputs for the classification process.

Using such an extensible machine learning model framework that classifies documents using fused features from different modalities, images of documents can be classified with higher accuracy than using conventional classification models that analyze features of a single modality or that analyze features of different modalities independently.

FIG. 1 illustrates an electronic transaction system 100, within which the document processing system and the machine learning model framework may be implemented according to one embodiment of the disclosure. The electronic transaction system 100 includes a service provider server 130 that is associated with the online service provider, a merchant server 120, and user devices 110 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., data access, account transfers or payments, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to conduct a purchase transaction with the merchant server 120 and/or the service provider server 130, to initiate a chargeback transaction request, etc.).

The user device 180 may include substantially the same hardware and/or software components as the user device 110, which may be used by a user who is internal to a service provider associated with the service provider server 130, such as an employee or contractor, to communicate with the service provider server 130 (e.g., receiving an alert when a document is determined to be corresponding to a wrong type of documents, etc.).

The merchant server 120, in various embodiments, may be maintained by a business entity (or in some cases, by a partner of a business entity that processes transactions on behalf of business entity). Examples of business entities include merchants, resource information providers, utility providers, online retailers, real estate management provid- ers, social networking platforms, a cryptocurrency broker- age platform, etc., which offer various items for purchase and process payments for the purchases. The merchant server 120 may include a merchant database 124 for iden- tifying available items or services, which may be made available to the user device 110 for viewing and purchase by the respective users.

The merchant server 120, in one embodiment, may include a marketplace application 122, which may be con- figured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., par- ticular items and/or transactions are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing of elec- tronic transactions between users (e.g., the user 140 and users of other user devices, etc.) and/or between users and one or more merchants. As such, the service provider server 130 may include a service application 138, which may be adapted to interact with the user device 110 and/or the merchant server 120 over the network 160 to facilitate the electronic transactions (e.g., electronic payment transac- tions, data access transactions, etc.) among users and mer- chants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between mer- chants and, for example, service entities.

In some embodiments, the service application 138 may include a payment processing application (not shown) for processing purchases and/or payments for electronic trans- actions between a user and a merchant or between any two entities (e.g., between two users, between two merchants, etc.). In one implementation, the payment processing appli- cation assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a correspond- ing application (e.g., a service provider mobile application) installed on the user devices 110 and 180 via one or more protocols (e.g., RESTAPI, SOAP, etc.). As such, the inter- face server 134 may include pre-generated electronic con- tent ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130. In some embodiments, in order to provide services to users (e.g., conducting a purchase transaction, releasing funds to a merchant based on a transaction, onboarding a user to a service, etc.), the service provider server 130 may require the user and/or the merchant to submit certain documents (e.g., a proof of identification document, a proof of shipment document, a proof of income or asset document, etc.). As such, the interface server 134 may provide an interface (e.g., a webpage, etc.) that enables users and/or merchants to submit an image of the requested document. For example, the user 140 may obtain an image of a document (e.g., by capturing a digital photo of the document using an image sensor of the user device 110 or a separate camera, etc.). The user 140 may then transmit the image to the service provider 130 via the interface.

The service provider server 130, in one embodiment, may be configured to maintain one or more user accounts and merchant accounts in an accounts database 136, each of which may be associated with a profile and may include account information associated with one or more individual users (e.g., the user 140 associated with user device 110, etc.) and merchants. For example, account information may include private financial information of users and merchants, such as one or more account numbers, passwords, credit card information, banking information, digital wallets used, or other types of financial information, transaction history, Internet Protocol (IP) addresses, device information associ- ated with the user account. In certain embodiments, account information also includes user purchase profile information such as account funding options and payment options asso- ciated with the user, payment information, receipts, and other information collected in response to completed fund- ing and/or payment transactions.

In one implementation, a user may have identity attributes stored with (such as accounts database 136) or accessible by the service provider server 130, and the user may have credentials to authenticate or verify identity with the service provider server 130. User attributes may include personal information, including photos, date of birth, social security number, home address, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a document processing module 132 that implements the document processing system as discussed herein. In some embodiments, the service provider server 130 may receive an image of a document that is associated with a transaction request submitted by a user or a merchant (e.g., the user 140). For example, as part of processing an onboarding request for onboarding the user 140 to a service offered by the service provider server 130, the service provider server 130 may require the user 140 to submit a proof of identification document (e.g., a passport, a driver's license, etc.) and/or a proof of income/asset document (e.g., a bank statement, etc.). In another example, as part of processing a purchase transaction between a user and a merchant, the service provider server 130 may require the merchant to submit a proof of shipment document (e.g., a shipping invoice, a shipping label, etc.).

In some embodiments, the service provider server 130 may extract information from the image of the document (e.g., extracting a name, a birthdate, a balance of a bank account, a tracking number, etc.), and use the information to process the transaction. However, as discussed herein, it is possible that the image of the document submitted by the user or the merchant does not meet a set of criteria. For example, the document in the image may correspond to a different type of document than the one that was required by the service provider server 130 (e.g., the service provider server 130 may prompt the user 140 for a driver's license, and the user 140 submitted a bank statement, etc.). In this case, the service provider server 130 may not be able to extract information from the image since the document has a different layout/format than the expected document. Alternatively, the service provider server 130 may extract information (e.g., bank account information) that is irrelevant to the processing of the transaction.

In another example, the user may engage in fraudulent activity by submitting a document that is associated with another user or a document that has been tampered with. In this case, even though the service provider server 130 may be able to extract information that appears to be relevant to the processing of the transaction, the extracted information does not reflect truthful information associated with the user, and may lead to an inaccurate risk assessment of the transaction, which would result in data loss and/or monetary loss to the online service provider and/or users of the service provider server 130.

As such, upon receiving the image of the document via the interface, the document processing module 132 may perform an initial analysis to the image of the document to classify the document in the image (e.g., determining whether the document is of the same type of document being requested, whether the document is a duplicate document that has been submitted to the service provider server 130, whether the image or the document has been tampered with, etc.). Based on the classification of the document, the document processing module 132 may continue to process the document (e.g., extract information from the document for processing a transaction for a user) or reject the document (e.g., providing an error message on the user device and prompting the user 140 to submit another document, etc.). In some embodiments, if it is determined that the transaction request is a fraudulent request based on the classification of the document, the document processing module 132 may transmit an alert to an internal device of the online service provider (e.g., the user device 180, etc.) and/or perform an action to a user account (e.g., suspending or reducing access level for the user account associated with the user who submitted the fraudulent document, etc.). As such, the document does not need to be fully processed based on this initial assessment.

Although the document processing module 132 is shown to reside within the service provider server 130 in FIG. 1, in order to improve the performance of classifying the document, the document processing module 132 of some embodiments may be embedded within an application (e.g., the UI application 112, or a website being rendered by the UI application 112, etc.) executed by the user device 110, or may reside in multiple edge computing devices.

Figure 2:
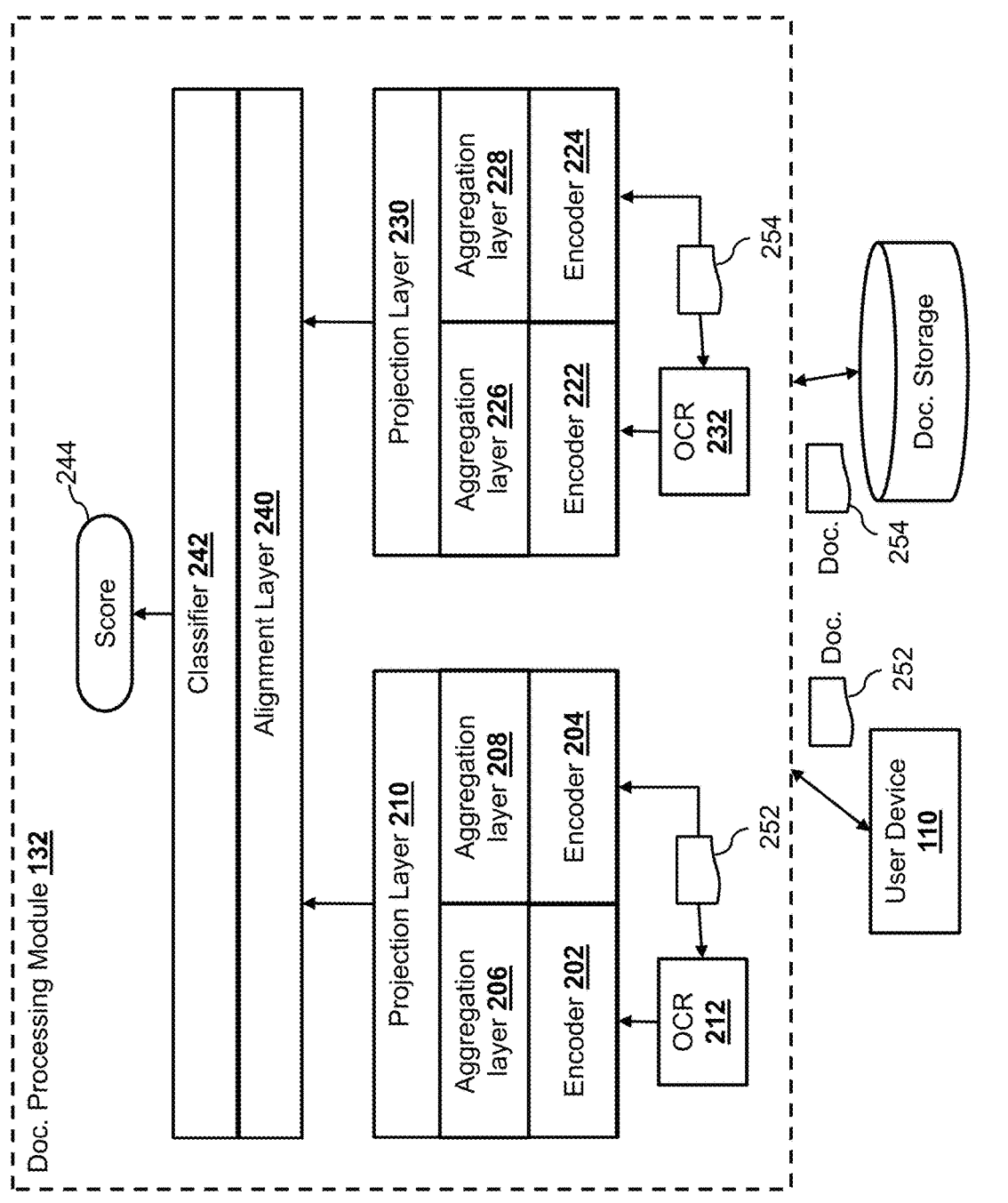
FIG. 2 is a block diagram illustrating a document processing module that implements a machine learning model framework according to an embodiment of the present disclosure.

FIG. 2 is a block diagram illustrating the document processing module 132 according to various embodiments of the disclosure. As discussed herein, the document processing module 132 may use the machine learning model framework as discussed herein to classify document images. As such, the document processing module 132 may include multiple encoders (including an encoder 202, an encoder 204, etc.) configured to extract features corresponding to different modalities from an image. The encoders included in the document processing module 132 may include one or more dedicated encoders and/or one or more multimodal encoders. Each dedicated encoder may be configured to extract features of a single modality from images, whereas each multimodal encoder may be configured to extract features of multiple modalities. For example, the encoder 202 may be a multimodal encoder configured to extract semantic features and lexical features from images of documents and the encoder 204 may be a dedicated encoder configured to extract layout features from images of documents.

When the document processing module 132 receives a document image 252 (e.g., via the interface provided by the interface server 134) as part of a process for processing a transaction, the document processing module 132 may use the encoders (e.g., the encoder 202, the encoder 204) to extract features of different modalities from the document image 252. Depending on the types of inputs required by the encoders, the document processing module 132 of some embodiments may include a text recognition engine 212 configured to extract text data (e.g., characters) from the document image 252, for example, by using an optical character recognition technique. The document image 252 and/or the text data extracted from the document image 252 may be provided to the encoders 202 and 204. The encoders may then extract various features from the document image 252. For example, the encoder 202 may extract semantic features and lexical features from text of the document image 252. The semantic features are extracted from the text based on parsing the text in one or more directions. An example encoder that can extract semantic features from text data is the bidirectional encoder representations from transformers (BERT) that extract semantic features representing meanings of the phrases and sentences found in the text based on parsing the text in both the forward and backward direction. As such, meanings may be derived from each word in the text based on the neighboring words in both directions.

Lexical features represent statistics of various words and characters found in the text of the document image 252 and the locations of those words and characters in the document image 252. Both the semantic features and the lexical features can be encoded into embeddings (e.g., vectors) that correspond to a particular latent space. A latent space is an abstract multi-dimensional space that is defined by a number of dimensions within the space. Each embedding comprises a series of values that corresponds to the different dimensions within the space. As such, each embedding may be represented by a point within the latent space based on the values corresponding to the different dimensions. Representing features within a latent space enables analysis and comparisons of the features in an efficient manner. For example, it can be determined that two documents are more similar with each other when the features extracted from two images of the two documents are closer together within the latent space, and that two documents are more distinct from each other when the features extracted from two images of the two documents are farther away from each other within the latent space.

In some embodiments, the encoder 204 may extract layout features from the document image 252. The layout features may represent structural information of the document within the image 252, such as locations of different elements, such as an image, a table, a logo, a title, different fields, etc. on the document. Similarly, the layout features may be represented by (or encoded into) embeddings (e.g., vectors) within a latent space.

In some embodiments, the document processing module 132 may include additional encoders for extracting different features of additional modalities from images of documents, such as visual features that represent imagery characteristics (e.g., overall appearance, texture, shape, etc.) of a document within the image 252, facial features of a face that appears on the document, tampering features that represent indication of potential tampering on the image 252 or the document itself, and other modalities. One advantage of the machine learning model framework adopted by the document processing module 132 is that it can incorporate encoders that are generated by different entities (e.g., different teams, different organizations, third-party components, off-the-shelf components, etc.). As such, the encoders 202 and 204 may generate features that correspond to different latent spaces—that is the features generated by the encoder 202 and the encoder 204 may have different dimensions. In some embodiments, the document processing module 132 may reconcile the different latent spaces later in the process, as will be described in more detail below.

After generating the features of different modalities from the document image 252, the document processing module 132 may provide one or more aggregation layers (e.g., an aggregation layer 206, an aggregation layer 208, etc.) to aggregate the features from each encoder into a single embedding (e.g., a single vector). Some of the encoders (e.g., the encoder 202) may generate multiple embeddings to represent the features extracted from the image document 252. For example, the encoder 202 may generate an embedding for each word, each phrase, or each sentence from the text of the document. As such, the output from the encoder 202 may comprise a matrix (e.g., multiple embeddings or multiple vectors). In some embodiments, the aggregation layer 206 may aggregate the multiple embeddings to form a single embedding. For example, the aggregation layer 206 may aggregate the embeddings generated by the encoder 202 by computing a sum or an average of all values for each feature corresponding to a dimension in the latent space, such that the resulting embedding is a sum (or an average) of all the embeddings generated by the encoder 202.

In some embodiments, the encoder 204 may generate only a single embedding to represent the layout features of the document image 252. In that case, the aggregation layer 208 may not have to perform any aggregation to the embedding output from the encoder 204. As such, the aggregation layers 206 and 208 may selectively perform the aggregation of embeddings based on the output of the encoders 202 and 204. Using this machine learning model framework, one can swap different encoders in and out of the system without requiring a modification to the structure of the framework. For example, one or more of the encoders 202 and 204 may be replaced by other encoders (e.g., encoders that are configured to extract features of the same or different modalities than the encoders 202 and 204), and the document processing module 132 may use the new encoders to classify document images without changing any other components within the machine learning model framework. This enables frequent and easy to implement improvements to the system, for example, by adopting encoders with better performances over time.

Features (e.g., embeddings, vectors, etc.) of different modalities that are extracted from the document image 252 by the encoders 202 and 204 may be used by a machine learning model (e.g., a classifier 242) to classify the document within the image 252. As discussed herein, using features corresponding to multiple modalities to analyze the image of a document would improve the accuracy performance of the classifier 242 over using only features corresponding to a single modality. However, if those features of different modalities are analyzed independently and/or separately, certain characteristics of the document may be lost, which would lead to inaccurate classification results. For example, the semantic features, the lexical features, and the layout features can very much be integral with each other in a document (e.g., text that represents a birthdate of a person should appear in the middle of a driver's license, a date is to the left of a transaction identifier that appears in each row of a table structure of a bank statement, etc.). It would be beneficial to analyze the features of the modalities as a whole when classifying the documents within the images.

As such, the document processing module 132 may include a projection layer 210 that is configured to fuse the features of different modalities such that the classifier 242 may analyze the fused features collectively. Since the features (e.g., embeddings, vectors, etc.) generated by the different encoders (e.g., the encoders 202, 204, etc.) may correspond to different latent spaces, in order to fuse the embeddings of different modalities into a single embedding (or vector), the projection layer 210 may first normalize the different latent spaces corresponding to the different features into a normalized latent space. For example, the normalized latent space may have a dimension that is the same or larger than the largest dimensions of the latent spaces. The projection layer 210 may then convert each embedding generated by a corresponding encoder to a converted embedding that corresponds to the normalized latent space. In some embodiments, the projection layer 210 may increase the number of dimensions for the embedding to the same number of dimensions associated with the normalized latent space, and pad values in the embedding that corresponds to the additional dimensions. The padded values may be '0's or other default values (e.g., an average of the values in the embedding). After converting each of the embeddings, the projection layer 210 may merge the converted embeddings into a fused embedding. The projection layer 210 may generate the fused embeddings in different manners, such as by generating a summation of all of the converted embeddings, generating an average of all of the converted embeddings, or performing any statistical function to the values of the converted embeddings.

In some embodiments, instead of converting the embeddings generated by the encoders, the projection layer 210 may concatenate all of the embeddings into a fused embedding, such that the fused embedding corresponds to a latent space having a dimension that equals to the sum of all of the dimensions corresponding the different encoders. Using the concatenation technique to fuse the embeddings may be more efficient as it requires less computation to concatenate the embeddings than to convert and then merge the embeddings. However, merging the embeddings provides a deeper level of fusion among the features of different modalities than concatenation. In some embodiments, the projection layer 210 may select either one of the techniques to fuse the embeddings based on various factors, such as the modalities corresponding to the embeddings, a number of embeddings being provided by the encoders, the type of classifications being performed on the document image 252, or other factors. For example, the projection layer 210 may determine to use the conversion and merging technique to fuse the embeddings when the task is associated with a higher risk (e.g., determining whether the document was a duplicated document submitted in the past in association with another account or whether the document has been tampered with, which indicates a fraudulent intent on the user who submitted the document image 252, etc.). On the other hand, the projection layer 210 may determine to use the concatenation technique to fuse the embeddings when the task is associated with a lower risk (e.g., determining whether the document submitted is of the requested type, etc.).

The fused embedding may be used by the classifier 242 to classify the document in the document image 252. In some embodiments, in order to perform the classification, the classifier 242 may require information associated with a baseline document with which the document from the image 252 can be compared. A baseline document may correspond to a type of document that is expected to be associated with the document in the image 252. By comparing the document in the image 252 against the baseline document, the classifier may determine whether the document in the image 252 is the same as the baseline document (e.g., a duplicate document) or of the same type as the baseline document based on similarities or differences between the two documents.

As such, in some embodiments, the document processing module 132 may obtain an image of a baseline document (e.g., a document image 254). The document may be a sample document that corresponds to the same type of document that the user was requested to provide. In some embodiments, the document may be a document submitted by another user that is linked to the user 140 who provided the document image 252. The other user may be linked to the user 140 based on a prior transaction conducted between the user 140 and the other user.

In some embodiments, the document processing module 132 may provide similar components to generate a fused embedding for the document image 254. For example, the document processing module 132 may include a text recognition engine 232 (that is similar to the text recognition engine 212) for extracting text data from the document image 254. The document processing module 132 may also include encoders 222 and 224 (which may be similar to the encoders 202 and 204, respectively) for extracting semantic features, lexical features, layout features, and/or other features of different modalities from the document image 254. The aggregation layers 226 and 228, which are similar to the aggregation layers 206 and 208, may merge multiple embeddings generated by each of the encoders 222 and 224 into a single embedding. The projection layer 230, which is similar to the projection layer 210, may fuse the different embeddings generated by the different encoders into a single fused embedding.

The text recognition engine 232, the encoders 222 and 224, the aggregation layers 226 and 228, the projection layer 230 used to process the document image 254 are shown to be different from the text recognition engine 212, the encoders 202, 204, the aggregation layers 206 and 208, and the projection layer 210 used to process the document image 252 in FIG. 2. However, in some embodiments, the same text recognition engine, encoders, aggregation layers, and projection layer are used for processing both document images 252 and 254. For example, in some embodiments, the text recognition engine 212, the encoders 202, 204, the aggregation layers 206 and 208, and the projection layer 210 may be used to generate fused embeddings from both of the document image 252 and the document image 254.

In some embodiments, the document processing module 132 may include an alignment layer 240 configured to perform additional processing to the fused embeddings before the fused embeddings to the classifier 242 for classifying the document in the image 252. In some embodiments, the alignment layer 240 may perform functions to the fused embeddings that would amplify similarities between the two document images 252 and 254 and/or amplify differences between the two document images 252 and 254. Example processing operations performed by the alignment layer 240 may include performing a subtraction operation on the two fused embeddings to generate a first comparison embedding. The alignment layer 240 may also perform a dot product operation on the two fused embeddings to generate a second comparison embedding. In some embodiments, the two fused embeddings and the comparison embeddings may be combined (e.g., concatenated) before providing the combined embedding as input values to the classifier 242. The classifier 242 may generate a classification output based on the input values, which may indicate a classification associated with the document in the document image 252 (e.g., whether the document corresponds to a requested type of document, whether the document is a duplicate document that has been submitted in the past, whether the document has been tampered with, etc.). For example, the classifier 242 may generate a score 244 that indicates a similarity between the document in the image 252 and the baseline document in the image 254.

In some embodiments, the document processing module 132 may determine one or more thresholds for classifying the document in the image 252. For example, the document processing module 132 may determine that the document in the image 252 corresponds to the requested type of document (e.g., the same type of document as the baseline document) when the score 244 is above a first threshold, and determine that the document in the image 252 does not correspond to the requested type of document when the score 244 is below the first threshold. If it is determined that the document in the image 252 does not correspond to the requested type of document, the document processing module 132 may transmit a notification to the user device 110 notifying the user 140 that the document submitted by the user 140 is of the wrong type of document, and may prompt the user 140, via the interface provided by the interface server 134, to submit another image.

The document processing module 132 may also determine that the document in the image 252 is the same as the baseline document in the image 254 when the score 244 is above a second threshold (the second threshold may be higher than the first threshold), and may also determine that the document in the image 252 is different from the baseline document in the image 254 when the score 244 is below the second threshold. If it is determined that the document in the image 252 is identical to the baseline image, the document processing module 132 may send a notification to the user device 180 notifying a person associated with the online service provider about a potential fraudulent transaction being conducted by the user 140. In some embodiments, the document processing module 132 may also perform preventive measures, such as suspending or reducing access levels associated with a user account of the user 140, to avoid monetary and/or data loss.

Figure 3:
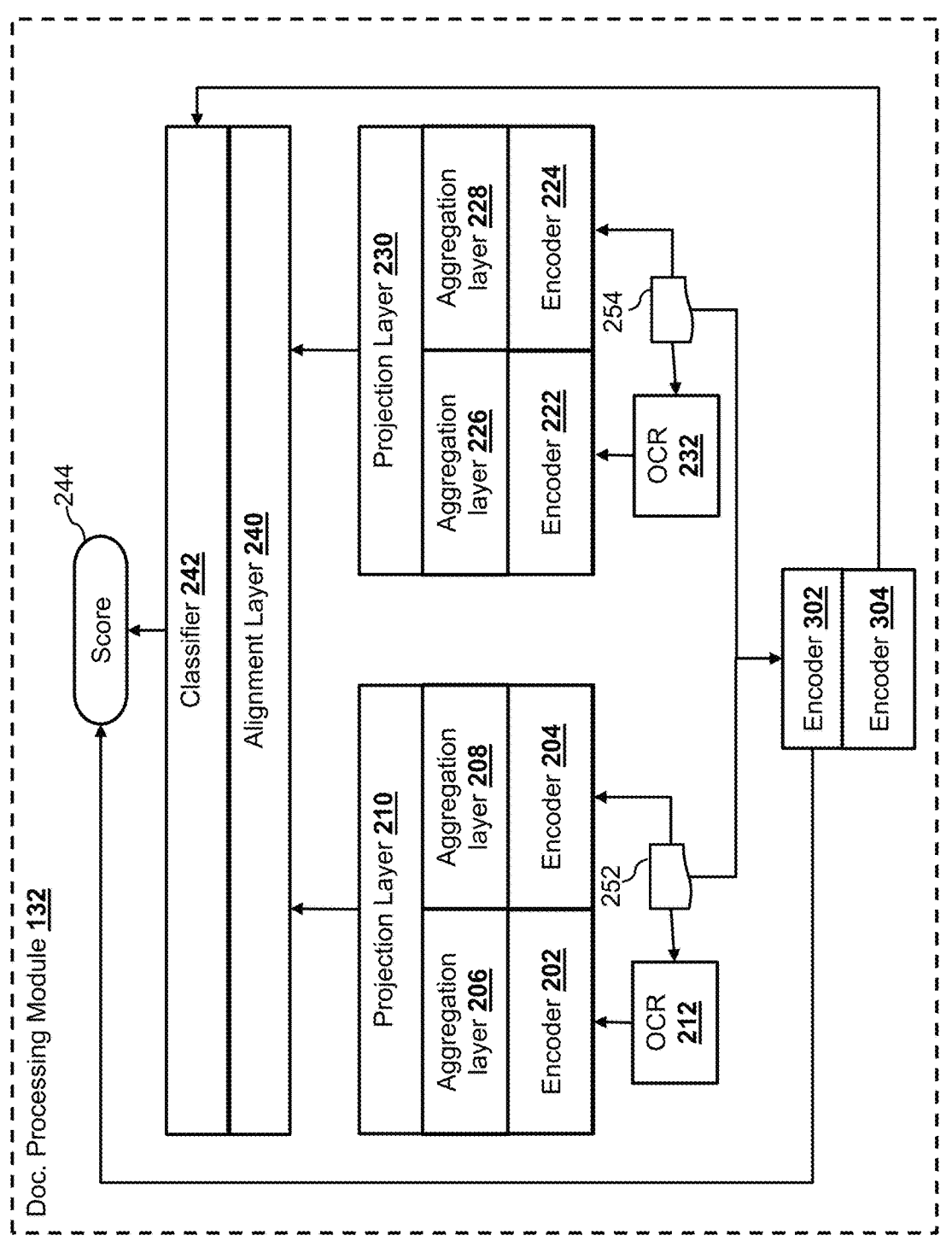
FIG. 3 is a block diagram illustrating a document processing module that incorporates additional encoders according to an embodiment of the present disclosure.

As discussed herein, the extensible architecture of the machine learning model framework enables additional modules to be added to the framework after the framework has been constructed. FIG. 3 illustrates different techniques for incorporating additional encoders into the machine learning model framework according to various embodiments of the disclosure. Specifically, as shown in FIG. 3, encoders 302 and 304 are added to the document processing module 132. The additional encoders 302 and 304 may be configured to extract features from the document images 252 and 254 that are different from the features extracted from the existing encoders (e.g., the encoders 202 and 204), such that the features extracted from the additional encoders 302 and 304 can supplement the features extracted by the existing encoders 202 and 204 in the classification process. For example, if the requesting document is of a type the typically includes a photo of a person (e.g., a passport, a driver's license, etc.), the document processing module 132 may select an encoder (e.g., the encoder 302) configured to extract facial features to be incorporated into the machine learning model framework. The inclusion of facial features in the classification process may enable the classifier 242 to determine whether the document in the image 252 includes a photo of the same person as the document in the image 254.

As such, the document processing module 132 may provide the images 252 and 254 to the encoder 302 for extracting facial features associated with the faces that appear in the images 252 and 254. Since facial features can be analyzed separately from other features, the encoder 302 may use the facial features extracted from the two images 252 and 254, and provide a score that indicates the similarity of the two faces. The document processing module 132 may then incorporate the score generated by the encoder 302 with the score 244, for example, by adding the two scores together, by calculating a weighted average between the two scores, etc.

In some embodiments, when the features that are extracted from an additional encoder can be integrated with other features from the existing encoders, the document processing module 132 may determine to fuse the embeddings generated by the additional encoder with the embeddings generated by the existing encoders (e.g., the encoders 202 and 204). For example, the encoder 304 may be configured to generate tampering features that indicate whether the document in the image 252 has been tampered with.

Since tampering detection is closely tied to how certain elements appear (correctly or incorrectly) at certain locations of a document, the document processing module 132 may determine that the tampering features can be integrated with other features, such as the layout features, the lexical features, etc. to enhance the accuracy of tampering detection. As such, after providing the document images 252 and 254 to the encoder 304 and obtaining the tampering features (e.g., a tampering embedding, etc.) from the encoder 304, the document processing module 132 may use the projection layer 210 to fuse the tampering embedding with the embeddings generated by other encoders and/or merge the tampering embedding with the two fused embeddings (e.g., by concatenating or merging the tampering embedding with the two fused embeddings) before providing the merged embedding to the classifier 242 to classify the document in the image 252.

Figure 4:
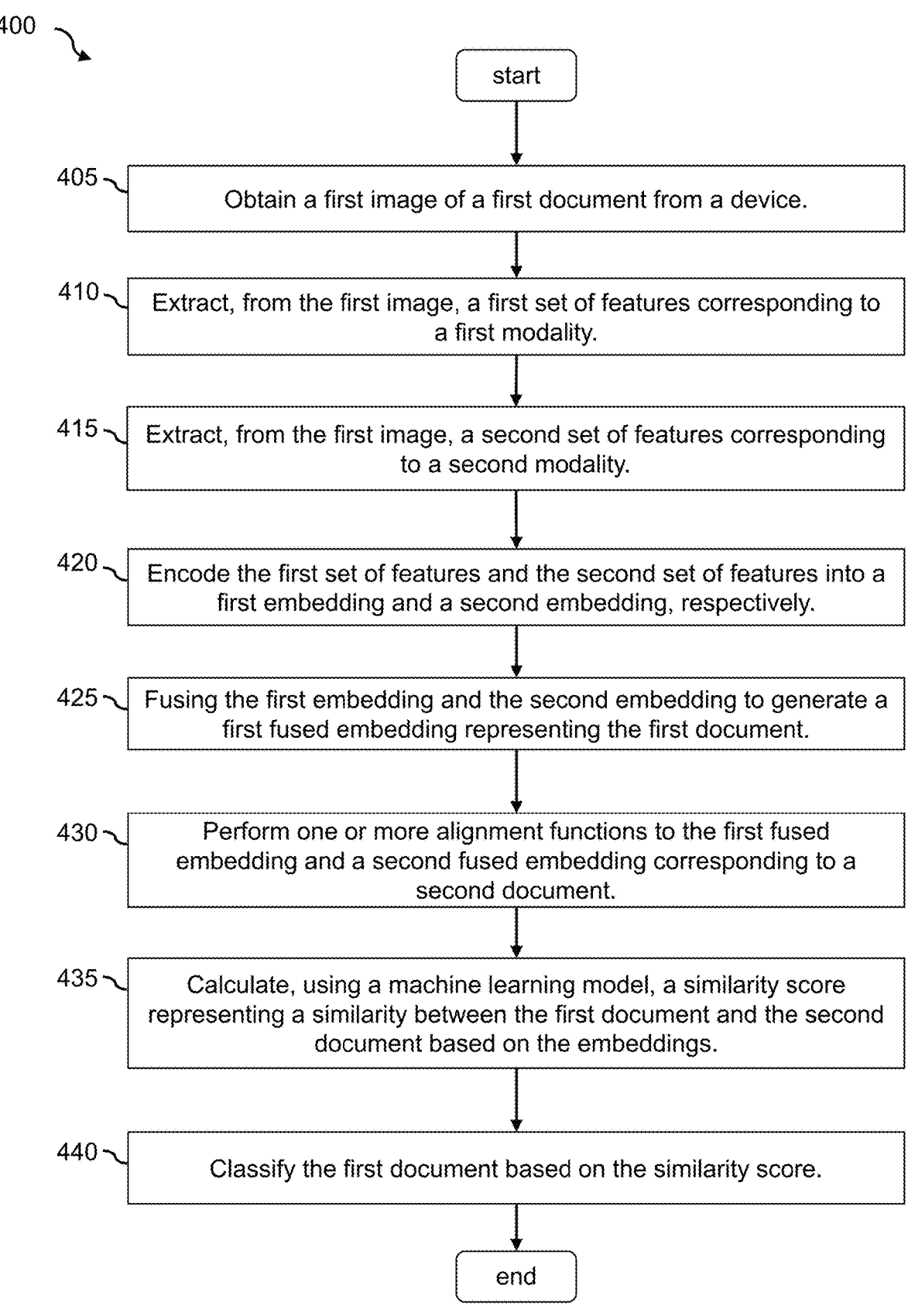
FIG. 4 illustrates an example flow for using a machine learning model framework to classify a document according to an embodiment of the present disclosure.

FIG. 4 illustrates a process 400 for classifying a document image using the machine learning model framework according to various embodiments of the disclosure. In some embodiments, at least a portion of the process 400 may be performed by the document processing module 132. The process 400 begins by obtaining (at step 405) a first image of a first document from a device. For example, the document processing module 132 may obtain the document image 252 from the user device 110 via the interface provided by the interface server 134. The document image 252 may be obtained as part of a transaction initiated by the user 140 of the user device 110 with the service provider server 130.

The process 400 then extracts (at step 410), from the first image, a first set of features corresponding to a first modality, extracts (at step 415), from the first image, a second set of features corresponding to a second modality, and encodes (at step 420) the first set of features and the second set of features into a first embedding and a second embedding, respectively. For example, the document processing module 132 may use different encoders to extract features of different modalities from the document image 252. In one example, the document processing module 132 may use the encoder 202 to extract semantic features and lexical features of the text that appears in the document image 252, and may use the encoder 204 to extract layout features that represent structure information of the document in the image 252. The encoder 202 may encode the semantic features and the lexical features into a first embedding. In some embodiments, the encoder 202 may initially generate multiple encodings for the semantic features and the lexical features. For example, the encoder 202 may generate an embedding for each word, each phrase, or each sentence within the document. The encoder 202 may then aggregate the embeddings into a single embedding (e.g., by adding the embeddings or averaging the embeddings, etc.). The encoder 204 may also encode the layout features into a second embedding.

After encoding the features, the process 400 fuses (at step 425) the first embedding and the second embedding to generate a first fused embedding representing the first document. For example, the projection layer 210 may fuse the embeddings generated by the encoders 202 and 204. In some embodiments, since the embeddings generated by the encoders 202 and 204 may correspond to different latent spaces, the projection layer 210 may determine a single latent space for the embeddings. The projection layer 210 may convert one or more of the embeddings such that both of the converted embeddings correspond to the single latent space.

The projection layer 210 may then merge the two converted embeddings to generate a first fused embedding.

The process 400 then performs (at step 430) one or more alignment functions to the first fused embedding and a second fused embedding corresponding to a second document. For example, the document processing module 132 may obtain another document (e.g., a baseline document) usable for comparing against the document in the document image 252. In some embodiments, the document processing module 132 may perform the same process to the baseline document as the document image 252 to generate a second fused embedding. The document processing module 132 may then use the alignment layer 240 to perform one or more functions to the first fused embedding and the second fused embedding. In some embodiments, the one or more functions may improve the accuracy of classifying the document in the image 252 by the classifier 242. For example, the alignment layer 240 may perform a subtraction function based on the first and second fused embeddings to accentuate the differences between the document image 252 and the document image 254. The alignment layer 240 may also perform a dot product function based on the first and second fused embedding to accentuate the similarities of the two fused embedding. The output of the functions may include a first comparison embedding (generated based on the subtraction function) and a second comparison embedding (generated based on the dot product function).

The process 400 calculates (at step 435), using a machine learning model, a similarity score representing a similarity between the first document and the second document based on the embeddings and classifies (at step 440) the first document based on the similarity score. For example, the document processing module 132 may provide the first fused embedding, the second fused embedding, the first comparison embedding, and the second comparison embedding to the classifier 242 (which may be a machine learning model). Based on the embeddings, the classifier 242 may produce a score 244, which may represent a similarity between the document image 252 and the document image 254. The document processing module 132 may then classify the document in the document image 252 based on the score 244. For example, the document processing module 132 may determine that the document in the document image 252 is of the same type of documents as the document in the document image 254 when the score 244 exceeds a first threshold. The document processing module 132 may also determine that the document in the document image 252 is identical to the document in the document image 254 when the score 244 exceeds a second threshold (the second threshold being higher than the first threshold).

As discussed herein, the machine learning model framework is extensible such that additional encoders may be incorporated into the machine learning model framework without re-building or re-training the machine learning model (e.g., the classifier 242).

Figure 5:
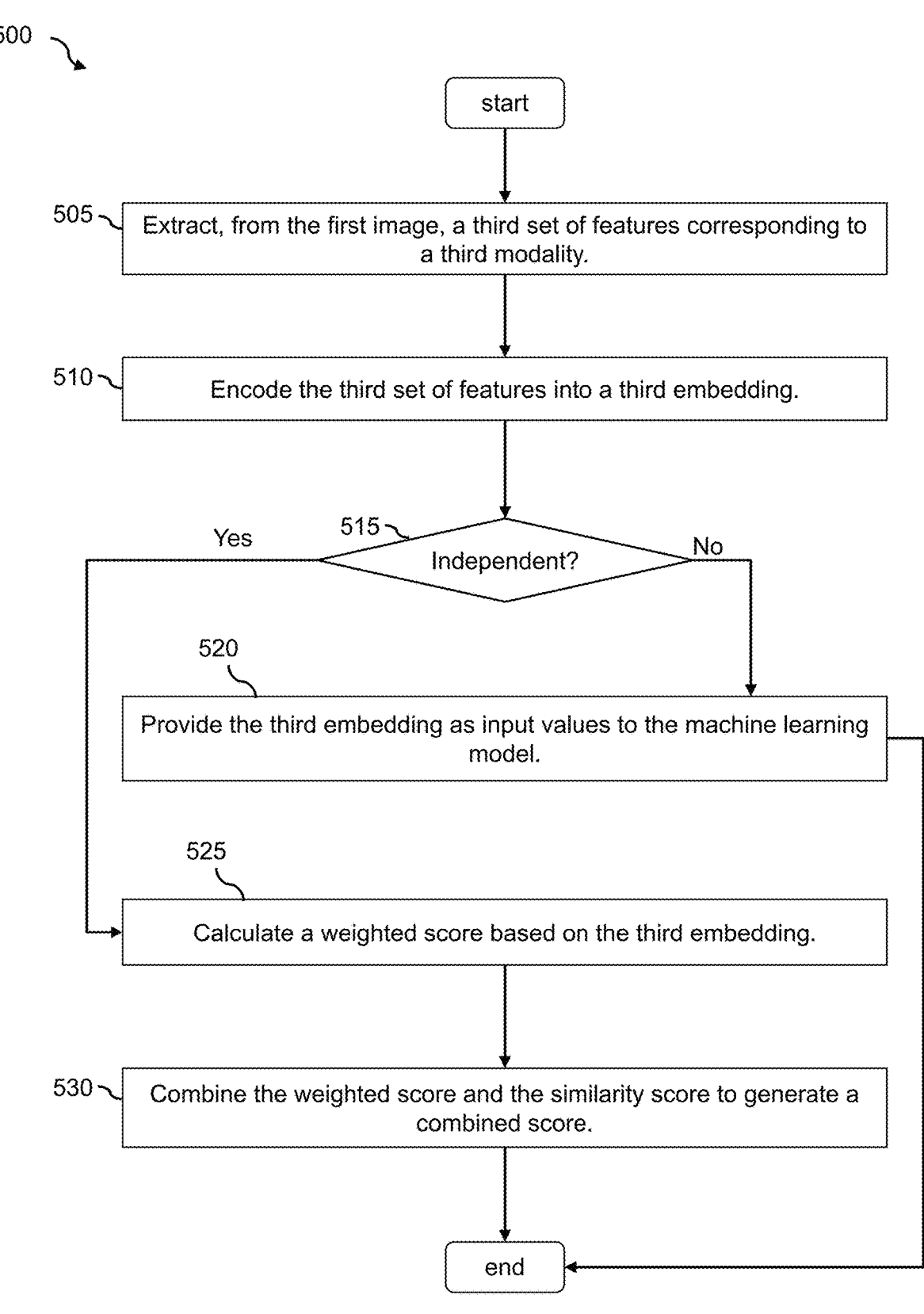
FIG. 5 illustrates an example flow for incorporating an additional encoder into the machine learning model framework according to an embodiment of the present disclosure.

FIG. 5 illustrates a process 500 for incorporating an additional encoder into the machine learning model framework according to various embodiments of the disclosure. In some embodiments, at least a portion of the process 500 may be performed by the document processing module 132. The process 500 begins by extracting (at step 505), from the first document, a third set of features corresponding to a third modality and encodes (at step 510) the third set of features into a third embedding. For example, the document processing module 132 may determine to incorporate the encoder 302 or the encoder 304 into the machine learning model framework. The document processing module 132 may use the new encoder (e.g., the encoder 302 or the encoder 304) to extract features corresponding to a different modality (e.g., facial features from a photo of a face, tampering features, etc.). The new encoder may encode the features into a third embedding.

The process 500 determines (at step 515) whether the encoded embedding can be analyzed independent of other embeddings. If it is determined that the encoded embedding can be analyzed independent of other embeddings, the process calculates (at step 525) a weighted score based on the third embedding and combines (at step 530) the weighted score and the similarity score to generate a combined score, in which case the document processing module 132 may classify the document in the document image 252 based on the combined score. On the other hand, if it is determined that the encoded embedding cannot be analyzed independent of other embeddings, the process provides (at step 520) the third embedding as additional input values to the machine learning model (the classifier 242). The classifier 242 may then produce the score 244 based on the third embedding as well as the other embeddings.

Figure 6:
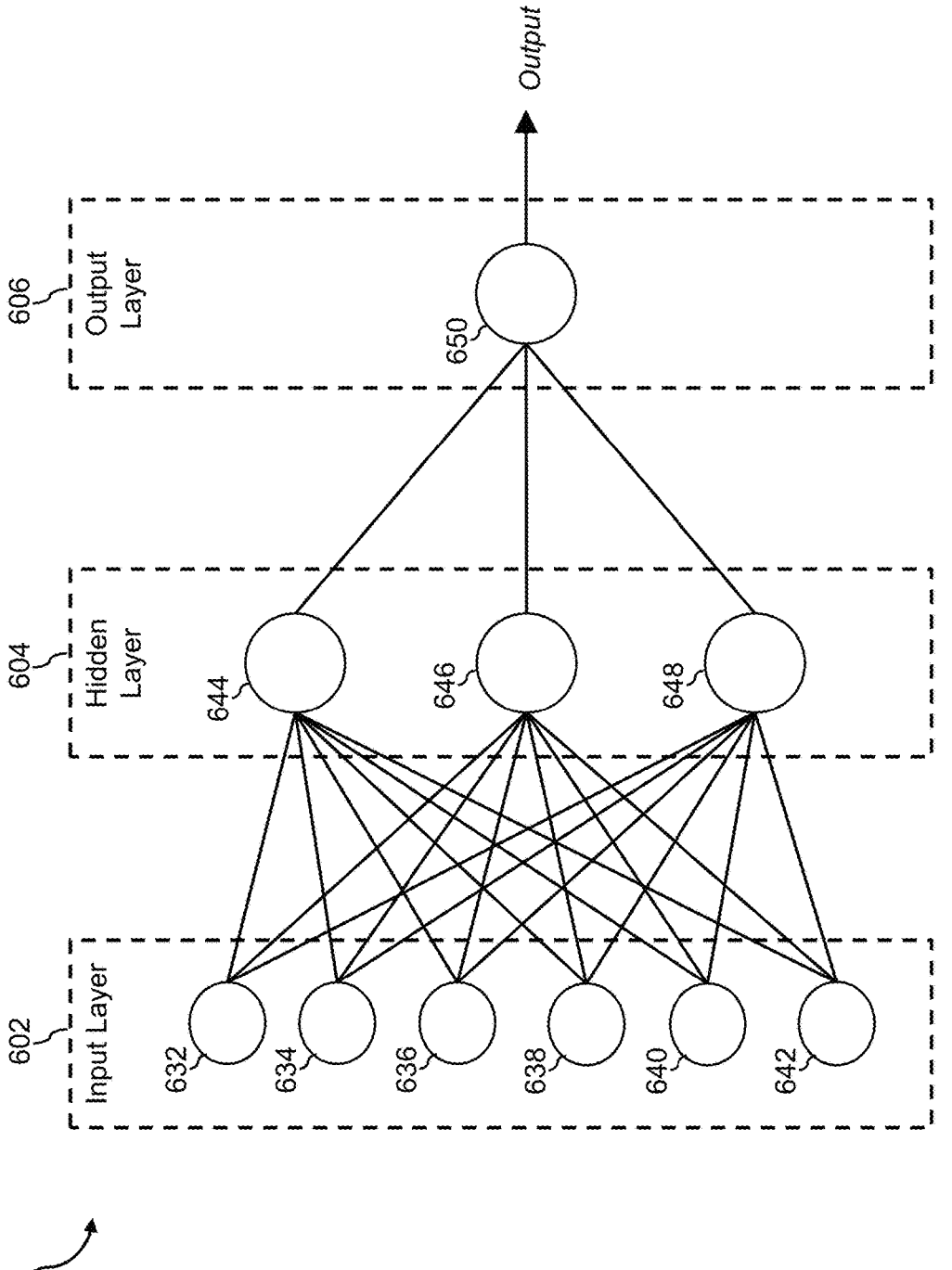
FIG. 6 illustrates an example neural network that can be used to implement a machine learning model according to an embodiment of the present disclosure.

FIG. 6 illustrates an example artificial neural network 600 that may be used to implement a machine learning model, such as the encoders 202, 204, 222, 224, 302, and 304, and the classifier 242. As shown, the artificial neural network 600 includes three layers—an input layer 602, a hidden layer 604, and an output layer 606. Each of the layers 602, 604, and 606 may include one or more nodes (also referred to as "neurons"). For example, the input layer 602 includes nodes 632, 634, 636, 638, 640, and 642, the hidden layer 604 includes nodes 644, 646, and 648, and the output layer 606 includes a node 650. In this example, each node in a layer is connected to every node in an adjacent layer via edges and an adjustable weight is often associated with each edge. For example, the node 632 in the input layer 602 is connected to all of the nodes 644, 646, and 648 in the hidden layer 604. Similarly, the node 644 in the hidden layer is connected to all of the nodes 632, 634, 636, 638, 640, and 642 in the input layer 602 and the node 650 in the output layer 606. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 604 is an intermediate layer between the input layer 602 and the output layer 606 of the artificial neural network 600. Although only one hidden layer is shown for the artificial neural network 600 for illustrative purpose only, it has been contemplated that the artificial neural network 600 used to implement any one of the computer-based models may include as many hidden layers as necessary. The hidden layer 604 is configured to extract and transform the input data received from the input layer 602 through a series of weighted computations and activation functions.

In this example, the artificial neural network 600 receives a set of inputs and produces an output. Each node in the input layer 602 may correspond to a distinct input. For example, when the artificial neural network 600 is used to implement any one of the encoders 202, 204, 222, 224, 302, and 304, the nodes in the input layer 602 may correspond to different parameters associated with an image (e.g., pixel data) or text data. When the artificial neural network 600 is used to implement the classifier 242, the nodes in the input layer 602 may correspond to different parameters associated with the embeddings.

In some embodiments, each of the nodes 644, 646, and 648 in the hidden layer 604 generates a representation, which may include a mathematical computation (or algorithm) that produces a value based on the input values received from the nodes 632, 634, 636, 638, 640, and 642. The mathematical computation may include assigning different weights (e.g., node weights, edge weights, etc.) to each of the data values received from the nodes 632, 634, 636, 638, 640, and 642, performing a weighted sum of the inputs according to the weights assigned to each connection (e.g., each edge), and then applying an activation function associated with the respective node (or neuron) to the result. The nodes 644, 646, and 648 may include different algorithms (e.g., different activation functions) and/or different weights assigned to the data variables from the nodes 632, 634, 636, 638, 640, and 642 such that each of the nodes 644, 646, and 648 may produce a different value based on the same input values received from the nodes 632, 634, 636, 638, 640, and 642. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 602 is transformed into rather different values indicative data characteristics corresponding to a task that the artificial neural network 600 has been designed to perform.

In some embodiments, the weights that are initially assigned to the input values for each of the nodes 644, 646, and 648 may be randomly generated (e.g., using a computer randomizer). The values generated by the nodes 644, 646, and 648 may be used by the node 650 in the output layer 606 to produce an output value (e.g., a response to a user query, a prediction, etc.) for the artificial neural network 600. The number of nodes in the output layer depends on the nature of the task being addressed. For example, in a binary classification problem, the output layer may consist of a single node representing the probability of belonging to one class (as in the example shown in FIG. 6). In a multi-class classification problem, the output layer may have multiple nodes, each representing the probability of belonging to a specific class. When the artificial neural network 600 is used to implement any one of the encoders 202, 204, 222, 224, 302, and 304, the output node 650 may be configured to generate one or more embeddings. When the artificial neural network 600 is used to implement the classifier 242, the output node 650 may be configured to generate the score 244.

In some embodiments, the artificial neural network 600 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware used to implement the neural network structure is specifically configured based on factors such as the complexity of the neural network, the scale of the tasks (e.g., training time, input data scale, size of training dataset, etc.), and the desired performance. The artificial neural network 600 may be trained by using training data based on one or more loss functions and one or more hyperparameters. By using the training data to iteratively train the artificial neural network 600 through a feedback mechanism (e.g., comparing an output from the artificial neural network 600 against an expected output, which is also known as the "ground-truth" or "label"), the parameters (e.g., the weights, bias parameters, coefficients in the activation functions, etc.) of the artificial neural network 600 may be adjusted to achieve an objective according to the one or more loss functions and based on the one or more hyperparameters such that an optimal output is produced in the output layer 606 to minimize the loss in the loss functions. Given the loss, the negative gradient of the loss function is computed with respect to each weight of each layer individually. Such negative gradient is computed one layer at a time, iteratively backward from the last layer (e.g., the output layer 606 to the input layer 602 of the artificial neural network 600). These gradients quantify the sensitivity of the network's output to changes in the parameters. The chain rule of calculus is applied to efficiently calculate these gradients by propagating the gradients backward from the output layer 606 to the input layer 602.

Parameters of the artificial neural network 600 are updated backwardly from the last layer to the input layer (backpropagating) based on the computed negative gradient using an optimization algorithm to minimize the loss. The backpropagation from the last layer (e.g., the output layer 606) to the input layer 602 may be conducted for a number of training samples in a number of iterative training epochs. In this way, parameters of the artificial neural network 600 may be gradually updated in a direction to result in a lesser or minimized loss, indicating the artificial neural network 600 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to predict a frequency of future related transactions.

Figure 7:
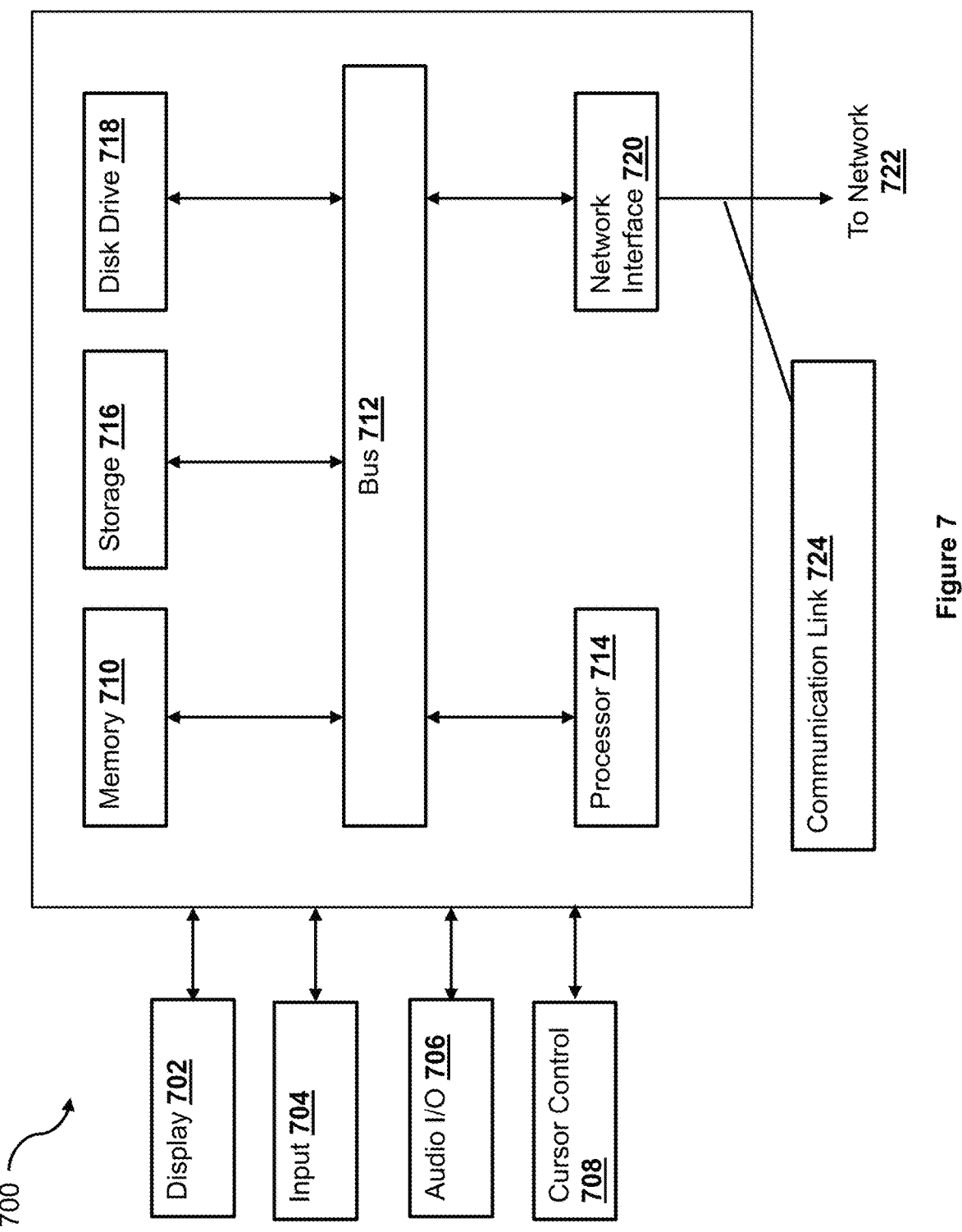
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, the user device 180, and the user device 110. In various implementations, each of the user devices 110 and 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 180 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the document classification functionalities described herein, for example, according to the processes 400 and 500.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

extracting, from a first document, a first set of features corresponding to a first modality and a second set of features corresponding to a second modality;

encoding, using a first encoder, the first set of features into a first embedding;

encoding, using a second encoder, the second set of features into a second embedding;

generating a first fused embedding, wherein the generating the first fused embedding comprises (i) converting the first embedding from a first latent space to a normalized latent space, (ii) converting the second embedding from a second latent space to the normalized latent space, and (iii) merging the converted first embedding and the converted second embedding; and determining, using a machine learning model, a similarity score representing a similarity between the first document and a second document based on the first fused embedding.

2. The system of claim 1, wherein the encoding the first set of features comprises:

encoding, using the first encoder, the first set of features into a first plurality of embeddings, wherein each embedding in the first plurality of embeddings corresponds to a distinct element within the first document; and generating the first embedding based on aggregating the first plurality of embeddings.

3. The system of claim 1, wherein the operations further comprise:

extracting, from the first document, a third set of features corresponding to a third modality;

encoding, using a third encoder, the third set of features into a third embedding; and combining the third embedding with the first fused embedding.

4. The system of claim 1, wherein the merging the converted first embedding and the converted second embedding comprises:

performing at least one of a summation or an average operation to the converted first embedding and the converted second embedding.

5. The system of claim 1, wherein the converting the first embedding comprises padding one or more additional values to the first embedding.

6. The system of claim 1, wherein the operations further comprise:

determining the normalized latent space based on the first latent space and the second latent space.

7. The system of claim 1, wherein the operations further comprise:

generating a second fused embedding based on features extracted from the second document, wherein the determining the similarity score is further based on the second fused embedding.

8. A method, comprising:

extracting, from a first image of a first document, first features corresponding to a first set of modalities;

encoding a first portion of the first features into a first embedding;

encoding a second portion of the first features into a second embedding;

generating a first fused embedding based on fusing the first embedding and the second embedding;

determining a first similarity score representing a first similarity between the first document and a second document based on the first fused embedding and a second fused embedding generated for a second image of the second document;

extracting, from the first image of the first document, second features corresponding to a second set of modalities;

encoding the second features into a third embedding;

determining a second similarity score representing a second similarity between the first document and the second document based on the third embedding; and classifying the first document based on a combined score generated from the first similarity score and the second similarity score.

9. The method of claim 8, further comprising:

generating a comparison embedding based on performing a function on the first fused embedding and the second fused embedding, wherein the first similarity score is determined further based on the comparison embedding.

10. The method of claim 9, wherein the function comprises a subtraction function.

11. The method of claim 9, wherein the function comprises a dot product function.

12. The method of claim 8, wherein the first embedding corresponds to a first latent space, wherein the second embedding corresponds to a second latent space, and wherein the method further comprises:

converting the first embedding from the first latent space to a normalized latent space; and converting the second embedding from the second latent space to the normalized latent space, wherein the generating the first fused embedding is further based on the converted first embedding and the converted second embedding.

13. The method of claim 12, further comprising:

determining the normalized latent space based on the first latent space and the second latent space.

14. The method of claim 8, wherein the determining the first similarity score is further based on the third embedding.

15. A non-transitory machine-readable medium having stored thereon machine-readable instructions executable to cause a machine to perform operations comprising:

obtaining, via a user interface of a device, a first image of a first document;

extracting, from the first image, first features corresponding to a plurality of modalities;

encoding a first portion of the first features into a first embedding;

encoding a second portion of the first features into a second embedding;

generating a first fused embedding based on fusing the first embedding and the second embedding;

extracting, from the first image, second features corresponding to a modality that is not included in the plurality of modalities;

encoding the second features into a third embedding;

determining, using a machine learning model, a similarity score representing a similarity between the first document and a second document based on the first fused embedding, the third embedding, and a second fused embedding generated for the second document; and determining a classification for the first document based on the similarity score.

16. The non-transitory machine-readable medium of claim 15, wherein the first image is obtained based on a request for a first type of documents, and wherein the operations further comprise:

prompting, via the user interface, a user of the device for a second image when the classification indicates that the first document corresponds to a second type of documents different from the first type of documents.

17. The non-transitory machine-readable medium of claim 15, wherein the operations further comprise:

restricting an account associated with the device access to one or more resources when the classification indicates that the first document is a match with the second document.

18. The non-transitory machine-readable medium of claim 15, wherein the operations further comprise:

generating the second fused embedding based on features extracted from the second document.

19. The non-transitory machine-readable medium of claim 15, wherein the first fused embedding, the second fused embedding, and the third embedding are provided to the machine learning model as input values.

20. The non-transitory machine-readable medium of claim 15, wherein the machine learning model is a first machine learning model, wherein the similarity score is a first similarity score, and wherein the operations further comprising:

determining, using a second machine learning model, a second similarity score representing a second similarity between the first document and the second document based on the third embedding; and generating a combined score based on the first similarity score and the second similarity score, wherein the determining the classification is further based on the combined score.

* * * * *